United States Patent
Hayashi et al.

(10) Patent No.: US 9,533,294 B2
(45) Date of Patent: Jan. 3, 2017

(54) HONEYCOMB STRUCTURAL BODY

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Naohiro Hayashi, Kariya (JP); Masakazu Murata, Obu (JP); Hiroyuki Matsubara, Gifu (JP); Oji Kuno, Nagoya (JP); Hiromasa Suzuki, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

(21) Appl. No.: 14/374,960

(22) PCT Filed: Jan. 23, 2013

(86) PCT No.: PCT/JP2013/051313
§ 371 (c)(1),
(2) Date: Jul. 28, 2014

(87) PCT Pub. No.: WO2013/111778
PCT Pub. Date: Aug. 1, 2013

(65) Prior Publication Data
US 2015/0005153 A1    Jan. 1, 2015

(30) Foreign Application Priority Data

Jan. 27, 2012 (JP) ................................. 2012-015737
Nov. 12, 2012 (JP) ................................. 2012-248302

(51) Int. Cl.
*B01D 39/14* (2006.01)
*B01D 39/20* (2006.01)
(Continued)

(52) U.S. Cl.
CPC ............... *B01J 29/70* (2013.01); *B01D 53/94* (2013.01); *B01J 32/00* (2013.01); *B01J 35/04* (2013.01);
(Continued)

(58) Field of Classification Search
CPC .................. B01D 46/247; B01D 46/2451; F01N 2330/48
See application file for complete search history.

(56) References Cited

U.S. PATENT DOCUMENTS 3,853,485 A * 12/1974 Hogan ................... B01D 53/86
422/180
5,108,685 A    4/1992 Kragle
(Continued)

FOREIGN PATENT DOCUMENTS

JP    H11-268018    10/1999
JP    3219292    8/2001
(Continued)

OTHER PUBLICATIONS

International Search Report for PCT/JP2013/051313, mailed Apr. 16, 2013.
(Continued)

*Primary Examiner* — Amber R Orlando
(74) *Attorney, Agent, or Firm* — Nixon & Vanderhye P.C.

(57) ABSTRACT

A honeycomb structural body has plural cell density sections having a cell density which is changed stepwise in a radial direction. A partition wall is formed between adjacent cell density sections. The cell density sections have a high cell density section having a maximum cell density, excepting an outermost cell density section formed at an outermost side, and a low cell density section having a minimum cell density, excepting an innermost cell density section formed at an innermost side. A relationship of $V-V_a \geq V_b + V_s$ is (Continued)

satisfied, where V indicates a volume of the honeycomb structural body if the overall honeycomb structural body is composed of the high cell density section, Va indicates a volume of the high cell density section, Vb indicates a volume of the cell density section, and Vs indicates a volume of the boundary wall which separates the low cell density section from the cell density section formed immediately inside of the low cell density section.

9 Claims, 8 Drawing Sheets (51) Int. Cl.
 *B01D 39/06* (2006.01)
 *B01J 29/70* (2006.01)
 *B01J 32/00* (2006.01)
 *B01J 35/04* (2006.01)
 *F01N 3/28* (2006.01)
 *B01D 53/94* (2006.01)

(52) U.S. Cl.
 CPC ............... *F01N 3/28* (2013.01); *F01N 3/2828* (2013.01); F01N 2330/34 (2013.01); F01N 2330/48 (2013.01)

(56) References Cited

U.S. PATENT DOCUMENTS

| | | | |
|---|---|---|---|
| 6,248,421 B1 | 6/2001 | Koike et al. | |
| 7,238,217 B2 * | 7/2007 | Cutler | B01D 46/2429 55/385.3 |
| 7,244,284 B2 * | 7/2007 | Miwa | B01D 45/16 422/177 |
| 7,384,441 B2 * | 6/2008 | Ito | B01D 39/2068 428/116 |
| 7,601,195 B2 * | 10/2009 | Ichikawa | B01D 46/2474 264/630 |
| 8,273,315 B2 * | 9/2012 | Kim | F01N 3/2066 422/171 |
| 8,747,760 B2 * | 6/2014 | Pimpalgaonkar | F01N 3/2892 422/176 |
| 9,073,289 B2 * | 7/2015 | Tamai | B32B 3/12 |
| 2002/0042344 A1 | 4/2002 | Kondo et al. | |
| 2004/0101654 A1 | 5/2004 | Hijikata | |
| 2004/0131512 A1 | 7/2004 | Abe et al. | |
| 2004/0244344 A1 * | 12/2004 | Ichikawa | B01D 39/2068 55/523 |
| 2005/0147791 A1 * | 7/2005 | Gulati | B01J 35/04 428/116 |
| 2005/0214503 A1 * | 9/2005 | Sakamoto | B01D 39/2068 428/116 |
| 2007/0231533 A1 | 10/2007 | Aniolek et al. | |
| 2007/0294989 A1 | 12/2007 | Ichikawa | |
| 2013/0045148 A1 * | 2/2013 | Chivilikhin | B01D 53/9454 423/212 |

FOREIGN PATENT DOCUMENTS

| | | |
|---|---|---|
| JP | 2002-177794 | 6/2002 |
| JP | 2003-25316 | 1/2003 |
| JP | 2003-254034 | 9/2003 |
| JP | 2006-263947 | 10/2006 |
| JP | 2006-281134 | 10/2006 |
| JP | 2008-018370 | 1/2008 |
| JP | 4094823 | 3/2008 |
| JP | 2008-200605 | 9/2008 |
| JP | 4332847 | 7/2009 |
| JP | 2009-532605 | 9/2009 |

OTHER PUBLICATIONS

Written Opinion of the International Searching Authority for PCT/JP2013/051313, mailed Apr. 16, 2013.
International Preliminary Report on Patentability (3 pgs.) dated Aug. 7, 2014 in corresponding International Application No. PCT/JP2013/051313 with an at least partial English—language translation thereof (8 pgs.).

* cited by examiner

FIG.12

HONEYCOMB STRUCTURAL BODY

CROSS-REFERENCE TO RELATED APPLICATION

This application is the U.S. national phase of International Application No. PCT/JP2013/051313 filed 23 Jan. 2013 which designated the U.S. and claims priority from Japanese Patent Applications No. 2012-15737 filed on Jan. 27, 2012, and No. 2012-248302 filed on Nov. 12, 2012, the contents of which are hereby incorporated by reference.

TECHNICAL FIELD

The present invention relates to honeycomb structural bodies to be used for a supporting member supporting catalyst capable of purifying exhaust gas emitted from internal combustion engines of motor vehicles, etc.

BACKGROUND ART

There are known honeycomb structural bodies, in which catalyst is supported, capable of purifying exhaust gas emitted from an internal combustion engine of motor vehicles, etc. For example the honeycomb structural body is comprised of partition walls arranged in a lattice shape and a plurality of cells formed by the partition walls. The honeycomb structural body is mounted to an exhaust gas passage through which exhaust gas is passing. When exhaust gas having a high temperature flows through the honeycomb structural body mounted to the exhaust gas passage, catalyst supported in the honeycomb structural body is activated by the exhaust gas of a high temperature, and purifies the exhaust gas.

Recently, because vehicles emission control for reducing motor vehicle emissions becomes stricter year by year, there is a strong demand of further decreasing harmful materials (cold emissions) generated immediately when an internal combustion engine starts. In order to solve this problem, it is requested to arrange the honeycomb structural body as close as possible to the engine and quickly increase a temperature of the honeycomb structural body to activate catalyst. Thus, it is requested for the honeycomb structural body to have a high exhaust gas purification performance and a high thermal shock resistance.

For example, a patent document 1 has disclosed a honeycomb structural body and defines a relationship in a catalyst amount, a surface area, a cell density, etc. between a central section and an outer peripheral section. Further, a patent document 2 has disclosed a honeycomb structural body and defines a relationship in an opening ratio, an absorbing rate, etc. between a central section and an outer peripheral section. In addition, a patent document 3 has disclosed a honeycomb structural body having an inner skin section formed between a first cell section (i.e. a central section) and a second cell section (i.e. an outer peripheral section), and defines a relationship in a cell density, etc. between the first cell section and the second cell section.

Further, a patent document 4 has disclosed a honeycomb structural body in which the number of web frames (i.e. partition walls) formed in a radial direction from a central side to an outer peripheral side is changed. Still further, a patent document 5 has disclosed a honeycomb structural body in which partition walls have a shape protruded from a central point toward an outside, and a cell density of a central section is smaller than a cell density of an outer peripheral section. Still further, a patent document 6 has disclosed a honeycomb structural body comprised of a plurality of honeycomb segments assembled together to form a monolithic body. The patent document 6 has shown a relationship in a thickness of a partition wall, a cell density, etc. between the outermost honeycomb segment, which forms an outermost peripheral surface, and the other honeycomb segments which do not form the outermost peripheral surface.

CITATION LIST

Patent Literature

[Patent document 1] Japanese patent laid open publication No. JP 2002-177794;
[Patent document 2] Japanese patent laid open publication No. JP 2008-18370;
[Patent document 3] Japanese patent No. JP 3219292;
[Patent document 4] Japanese Kohyo (Published Japanese translation of a PCT application) No. JP 2009-532605;
[Patent document 5] Japanese patent No. JP 4511396; and
[Patent document 6] Japanese patent No. JP 4094823.

SUMMARY OF INVENTION

Technical Problem

However, the honeycomb structural body disclosed in the patent document 1 cannot show an optimum relationship in a cell density between the central section and the outer peripheral section, and it is therefore difficult for the honeycomb structural body to have an adequate exhaust gas purification performance. The honeycomb structural body disclosed in the patent document 2 is requested to increase a pore diameter formed in the outer peripheral section and increase the number of pores in order for the outer peripheral section to increase its absorbing ratio although the outer peripheral section is greater in the absorbing ratio and the opening ratio than the central section. Accordingly, when a monolithic body of the honeycomb structural body is produced, it is necessary for the outer peripheral section to use different raw material having a different particle size from a particle size of raw material for producing the other sections. Thus it is necessary to extrude the different raw material to produce the outer peripheral section. This causes a possible generation of cracks in the honeycomb structural body because of generating a differential shrinkage between them during drying and firing. In order to decrease an amount of emissions, it is preferable to increase a porosity of the central section, through which most exhaust gas flows, and lighten its weight. However, it is impossible to decrease an adequate amount of emissions because the structure disclosed in the patent document 2 requests to increase a porosity of the external section. Further, the patent document 2 does not provide an optimum relationship in opening ratio (i.e. cell density) between the central section and the outer peripheral section, and is therefore difficult to maintain adequate exhaust gas purification performance.

Further, the patent document 3 does not describe a relationship in cell density between the first cell section (i.e. central section) and the second cell section (i.e. outer peripheral section) in the honeycomb structural body. Further, the patent document 3 does not show the exhaust gas purification performance. Further, in the structure of the honeycomb structural body disclosed in the patent document 4, because the number of webs (i.e. partition walls) formed in a radius direction is decreased toward a central side, most exhaust gas is concentrated and flows to the central section. This structure allows insufficiently purified exhaust gas to pass through the honeycomb structural body. As a result, it is difficult to obtain adequate exhaust gas purification performance.

In addition, the honeycomb structural body disclosed in the patent document 5 has a structure in which exhaust gas is concentrated to and easily passes through the central section, and a non-uniform cell density part is more formed in the outer side. Accordingly, this structure does not contribute to the improvement of the exhaust gas purification performance while considering the flow of the exhaust gas. Further, the patent document 5 does not disclose any data therefor. Still further, because a cross section of the honeycomb structural body in a direction perpendicular to an axial direction has an elliptical shape, a temperature difference increases between the inside area and the outside area along a direction of a major diameter. As a result, this structure decreases the thermal shock resistance. Further, because the honeycomb structural body disclosed in the patent document 6 has a monolithic body in which a plurality of segments are assembled together, each partition wall at a joint part has an increased thickness, and as a result this causes a partial area having a large thermal capacity. This structure causes a large temperature difference between the inner side and the outer side, and as a result has a possible decrease of the thermal shock resistance due to such a large temperature difference.

The present invention has been completed with a view to addressing the above issues and has an object to provide a honeycomb structural body showing an improved thermal shock resistance while maintaining its exhaust gas purification performance.

Solution to Problem

In accordance with an aspect of the present invention, an embodiment provides a honeycomb structural body as a monolithic mold made of cordierite comprising partition walls arranged in a lattice shape and a plurality of cells surrounded by the partition walls. The honeycomb structural body has a plurality of cell density sections having a cell density changed stepwise in a radial direction from a central side to an outer peripheral side in a cross section. This cross section is perpendicular to an axial direction. A boundary wall is formed between the cell density sections which are adjacent to each other in order to partition off these cell density sections. The cell density sections include a high cell density section which has a maximum cell density, excepting an outermost cell density section formed at an outermost side, and a low cell density section which has a minimum cell density, excepting an innermost cell density section formed at an innermost side. The honeycomb structural body satisfies a relationship of $V-Va \geq Vb+Vs$. Reference character V indicates a volume of the honeycomb structural body if the overall honeycomb structural body is composed of the high cell density section only. Reference character Va indicates a volume of the high cell density section. Reference character Vb indicates a volume of the low cell density section. Reference character Vs indicates a volume of the boundary wall which separates the low cell density section from the cell density section formed immediately inside of the low cell density section.

Advantageous Effects of Invention

The honeycomb structural body, as previously described, has the plural cell density sections, the cell density of which is changed stepwise from the central side to the outer peripheral side in a cross section (hereinafter, will also be referred to as the radial cross section). This cross section is perpendicular to an axial direction. Further, the partition wall is formed between the cell density sections which are adjacent to each other in order to partition off the adjacent cell density sections. The honeycomb structural body satisfies the relationship of $V-Va \geq Vb+Vs$, where reference character V indicates the volume of the honeycomb structural body if the overall honeycomb structural body is composed of the high cell density section only. As previously described reference character Va indicates the volume of the high cell density section. Reference character Vb indicates the volume of the cell density section. Reference character Vs indicates the volume of the boundary wall which separates the low cell density section from the cell density section formed immediately inside of the low cell density section. This structure makes it possible to improve the thermal shock resistance of the honeycomb structural body while adequately maintaining the exhaust gas purification performance.

That is, after an internal combustion engine is rotated at a high load, a rotation speed of the internal combustion engine is decreased to enter the internal combustion engine to its idle condition, a rapid cooling of the internal combustion engine occurs, and a section, through which most exhaust gas passes, is speedy cooled. For example, the honeycomb structural body satisfies the relationship $(V-Va \geq Vb+Vs)$ of these volumes so that the high cell density section is formed at the part through which most of exhaust gas passes (for example, at the central section), and the cell density section having a low thermal capacity is formed at the outside of the high cell density section. This structure makes it possible to suppress occurrence of a temperature difference (hereinafter, will be often referred to the internal-external temperature difference) between the inner side and the outer side of the honeycomb structural body when compared with a honeycomb structure body in which an overall area thereof has a constant cell density. This structure makes it possible to improve the thermal shock resistance.

In addition, the boundary wall is formed between the cell density sections to partition off the cell density sections. This structure makes it possible to increase the strength thereof and improve the thermal shock resistance. Further, although exhaust gas is concentrated to and easily flows in the inner side (for example in the inside section), it is possible for the structure of the honeycomb structural body to uniform the distribution of a flow speed of exhaust gas by adjusting the cell density in the inner side and the outer side of the honeycomb structural body. This makes it possible to purify exhaust gas in the overall honeycomb structural body with high efficiency and decrease emissions.

The present invention can provide the honeycomb structural body having its increased thermal shock resistance while maintaining its exhaust gas purification performance.

DESCRIPTION OF EMBODIMENTS

As previously described, the honeycomb structural bodies according to the present invention have a plurality of the cell density sections, a cell density of which is changed stepwise from the central side to the outer peripheral side in a cross section which is perpendicular to the axial direction. That is, the honeycomb structural body is divided to a plurality of sections (i.e. the cell density sections) along a radial direction from the central side to the outer peripheral side. Each of the cell density sections has a constant cell density. The cell density sections adjacent to each other have a different cell density so that the cell density of the cell density sections is changed stepwise in a radial direction.

As previously described, the high cell density section has the maximum cell density in the overall cell density sections, excepting the cell density section formed at the outermost side. In addition, as previously described, the low cell density section has the minimum cell density in all of the cell density sections, excepting the cell density section formed at the innermost side. Accordingly, for example, when the honeycomb structural body has two cell density sections only, i.e. the inner side (at the central section) and the outer side (at the outer peripheral section), one is the high cell density section and the other is the low cell density section. The volume V is a volume when the honeycomb structural body is composed of the high cell density section only. That is, the volume V is defined when the honeycomb structural body has a uniform structure composed of the high cell density section only.

When the relationship of $V-Va<Vb+Vs$ is satisfied between the volumes V, Va, Vb and Vs, a thermal capacity of the outside becomes high and a moisture retaining property becomes high even if the high cell density section is arranged at the section (for example, at the central section) through which most of exhaust gas passes, and the low cell density section is arranged at the outer side of the high cell density section. This structure is difficulty in adequately suppressing a temperature difference between the inner side and the outer side at a rapid cooling of the honeycomb structural body. Accordingly, this structure decreases the thermal shock resistance of the honeycomb structural body.

It is possible to satisfy the relationship of is $1 \le (V-Va)/(Vb+Vs) \le 1.72$ between the volumes V, Va, Vb and Vs (Claim 2). It is further possible to satisfy the relationship of $1.2 \le (V-Va)/(Vb+Vs) \le 1.58$ between the volumes V, Va, Vb and Vs (Claim 3). In these cases, it is possible to suppress a temperature difference between the inner side and the outer side at a rapid cooling of the honeycomb structural body, and improve the thermal shock resistance.

When the relationship of $(V-Va)/(Vb+Vs) \le 1.72$ is satisfied between the volumes V, Va, Vb and Vs, there is a possible decrease of the cell density of the outer side to low and a possible flow of exhaust gas easily in the outer side when the high cell density section is arranged at the section (for example, at the central side), through which most of exhaust gas usually flows, and the low cell density section is arranged at the outer side of the high cell density section. In this structure, an outer side temperature of the honeycomb structure body is low, but an inner side temperature of the honeycomb structure body is kept high when rapidly cooling of the honeycomb structural body. This easily causes a temperature difference between the inner side and the outer side during rapid cooling of the honeycomb structural body.

It is possible for the honeycomb structural body to satisfy a relationship of $Ta \le Tb$, where reference character Ta indicates a thickness of the partition wall in the high cell density section, and reference character Tb indicates a thickness of the partition wall in the low cell density section. This structure makes it possible to obtain an adequate strength of the overall honeycomb structural body while adjusting the cell density of each of the cell density sections. This makes it possible to further improve the thermal shock resistance.

It is possible for the partition walls of the high cell density section to have the thickness Ta within a range of 30 to 120 μm, for example. In addition, it is possible for the partition walls of the low cell density section to have the thickness Tb within a range of 50 to 200 μm, for example.

It is possible to have a structure which satisfies a relationship of $1<Ma/Mb<2$, where reference character Ma indicates the cell density of the high cell density section, and reference character Mb indicates the cell density of the low cell density section (Claim 5). This structure makes it possible to have the effect of decreasing emissions and maintaining the exhaust gas purification performance decrease emissions. Furthermore, it is preferable for the value Ma/Mb to be within a range of 1.25 to 1.5 in order to have higher exhaust gas purification performance.

If the relationship between the cell density Ma and the cell density Mb is $Ma/Mb \le 1$, there is a possibility of it being difficult to adequately show the effects previously described, i.e. to maintain the exhaust gas purification performance. On the other hand, if the relationship between the cell density Ma and the cell density Mb is $Ma/Mb \ge 2$, there is a possibility that the cell density of the outer side becomes low and exhaust gas easily flows in the outer side when the high cell density section is arranged at the section (for example, at the central side), through which most of exhaust gas usually flows, and the low cell density section is arranged at the outside of the high cell density section. This structure allows insufficient purified gas to pass through the honeycomb structural body, and as a result, this structure has a possible decrease of the exhaust gas purification performance.

It is possible for the high cell density section to have the cell density Ma within a range of 62 to 182 cells/cm$^2$, for example. It is further is possible for the low cell density section to have the cell density Mb within a range of 46.5 to 139.5 cells/cm$^2$.

It is possible to have the structure which satisfies a relationship of $0.2 \leq r/R < 1$, where reference character R indicates a radius of the honeycomb structural body, and reference character r indicates a radius of the boundary wall which separates the high cell density section from the cell density section formed immediately outside of the high cell density section (Claim 6). This structure makes it possible to provide the adequate effect of decreasing emissions while maintaining its exhaust gas purification performance. It is further preferable for the value r/R to be within a range of 0.5 to 0.8 in order to obtain higher exhaust gas purification performance.

The radius R of the honeycomb structural body and the radius r of the partition wall are a radius of a cross section of the honeycomb structural body and a radius of a cross section of the partition wall, which are perpendicular to an axial direction (i.e. a gas flow direction) of the honeycomb structural body. When the honeycomb structural body or the boundary wall has a circular shape, the radius R, r is a radius thereof, and when having a polygonal shape, the radius R, r is a radius of an inscribed circle thereof.

It is possible to arrange the high cell density section at the innermost side in the plural cell density sections (Claim 7). Because the high cell density section having a large surface area is arranged at the section (for example, at the central section), through which most of exhaust gas flows, this structure makes it possible to decrease emissions and maintain the exhaust gas purification performance. In addition, because the low cell density section is arranged outside of the high cell density section in this structure, it is possible to have the effect of suppressing a temperature difference between the inner side and the outer side when the honeycomb structural body is rapidly cooled and increase the thermal shock resistance. In the structure previously described, it is not necessary to align the central axis of the high cell density section with the central axial of the honeycomb structural body. For example, it is possible to determine the location of the high cell density section on the basis of the shape of the exhaust gas pipe, the flow of exhaust gas, etc.

The honeycomb structural body previously described has the two cell density sections in which the high cell density section is arranged at the inner side (i.e. at the central side) and the low cell density section is arranged at the outer side (i.e. at the outer peripheral side). This structure makes it possible to adequately show the effects of: decreasing emissions; maintaining the exhaust gas purification performance; suppressing a temperature difference between the inner side and outer side from increasing at a rapid cooling; and increasing the thermal shock resistance.

It is possible for the honeycomb structural body to have a structure in which not less than three cell density sections are formed and a cell density thereof is changed stepwise. This structure further increases the effect of suppressing occurrence of a temperature difference between inner side and outer side at a rapid cooling, and increasing the thermal shock resistance. However, this structure has a possible decrease of the strength (i.e. isostatic strength, etc.) of the honeycomb structural body because of more decreasing the cell density of the outermost cell density section. In order to avoid this, the cell density of the outermost cell density section is increased to maintain the strength of the honeycomb structural body.

The honeycomb structural body previously described is used in catalytic converters, etc., for example. The catalytic converter purifies exhaust gas by using catalyst. That is, the catalyst is supported on the surfaces of the partition walls of the honeycomb structural body. It is possible for the honeycomb structural body to have a porosity within a range of 10 to 70%, for example.

It is possible for the cells to have a circular shape, a polygonal shape (for example, a square shape and a hexagonal shape) in a radial cross section. Further, it is possible for the outer shape of the cell density section to have a circular shape, a polygonal shape, etc. in a radial cross section. Still further, it is possible for the boundary wall to have a thickness within a range of 20 to 250 μm. It is also possible for the shape of the boundary wall to have a circular shape and a polygonal shape, etc. in a radial cross section.

EXAMPLES

The exemplary embodiment has produced a plurality of honeycomb structural bodies (as embodiments E1 to E16) and a plurality of honeycomb structural bodies (as comparison examples C1 to C4), and evaluated a pressure loss, exhaust gas purification performance, thermal shock resistance, etc. thereof.

Figure 1:
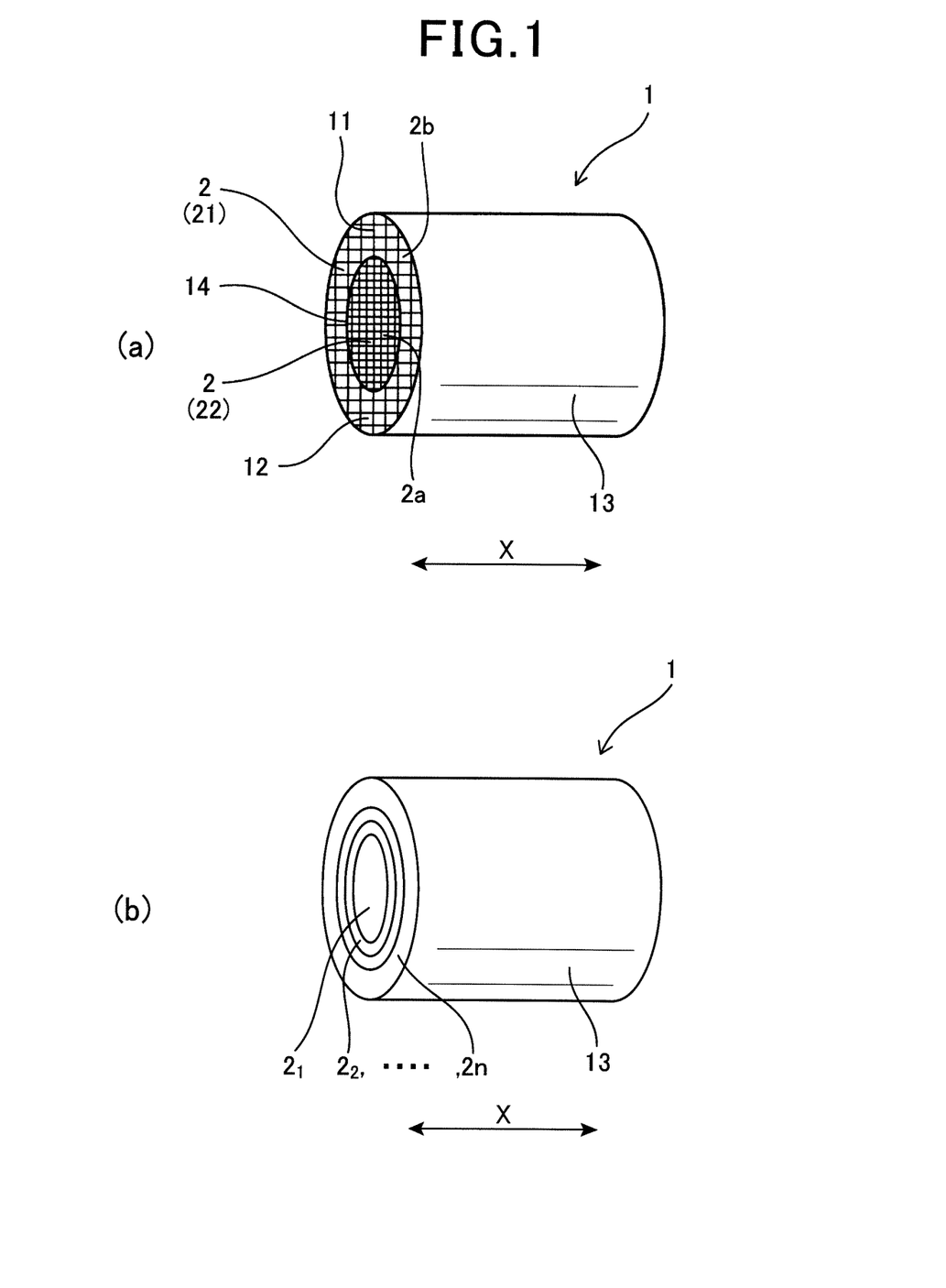
FIG. 1 are perspective views explaining a honeycomb structural body according to the present invention, (a) shows an exemplary embodiment having two cell density sections and (b) shows an exemplary embodiment having a plurality of cell density sections.
Figure 2:
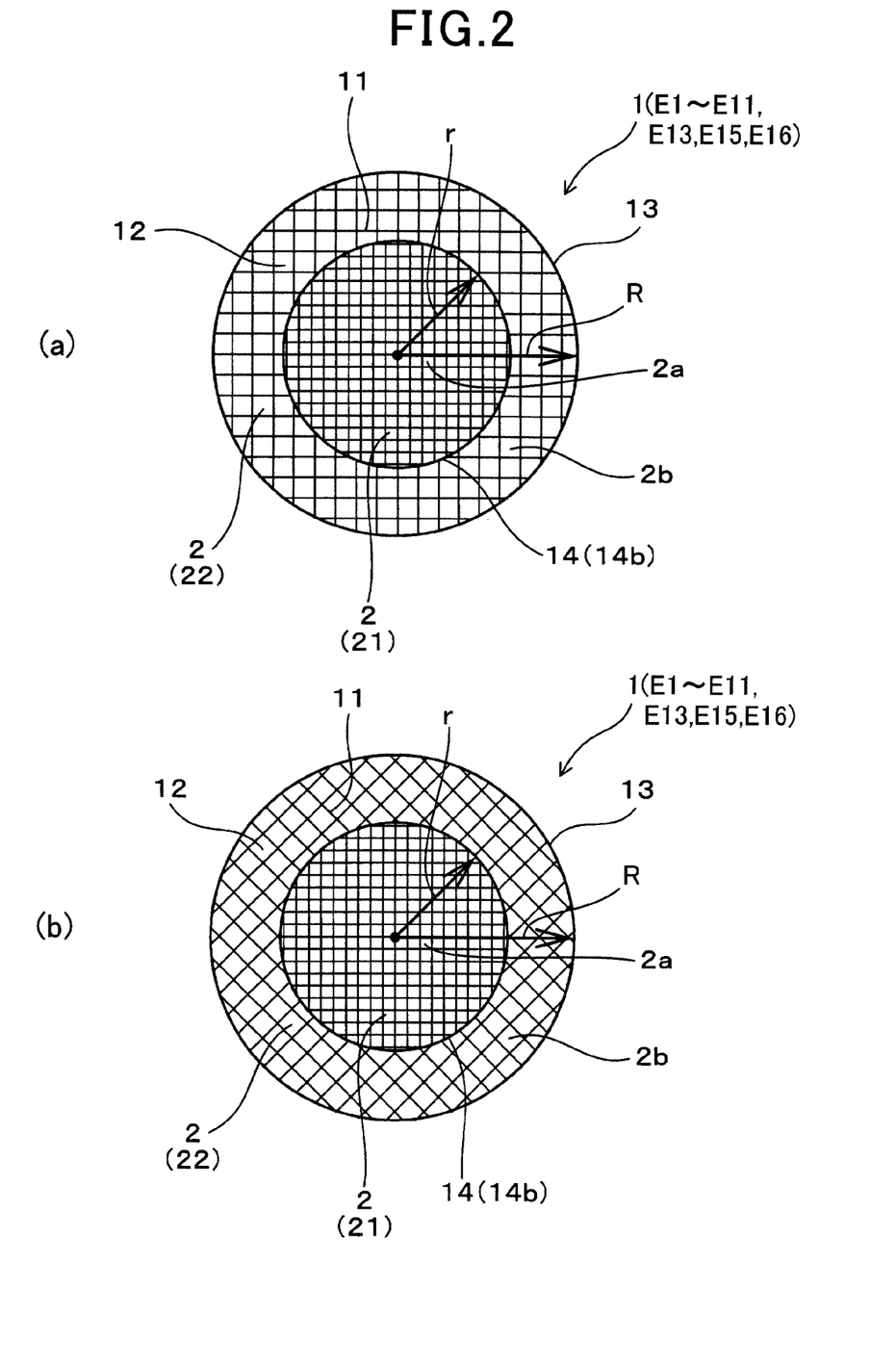
FIG. 2 is a view explaining a cross section in a radial direction of the honeycomb structural body according to embodiments E1 to E11, E13, E15 and E16.
Figure 3:
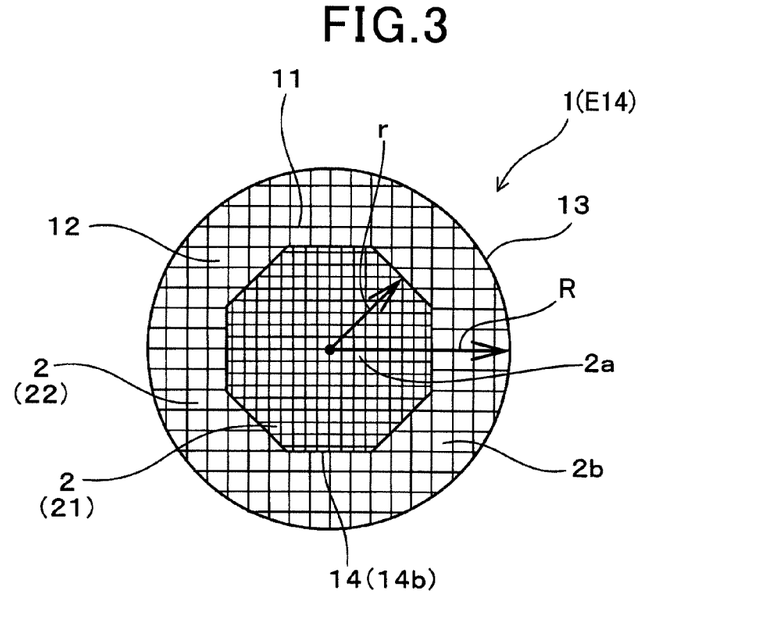
FIG. 3 is a view explaining a cross section in a radial direction of the honeycomb structural body according to an embodiment E14.
Figure 4:
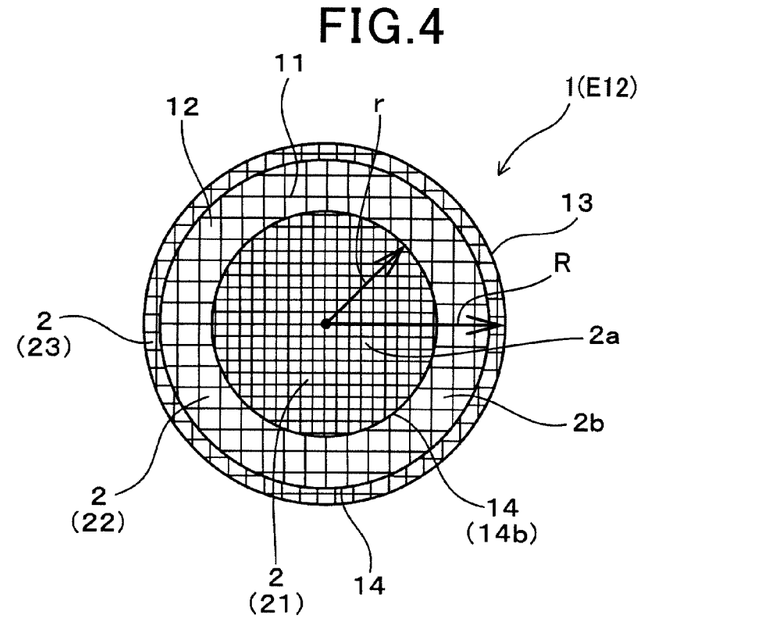
FIG. 4 is a view explaining a cross section in a radial direction of the honeycomb structural body according to an embodiment E12.

A description will be given of the honeycomb structural bodies (corresponding to the embodiments E1 to E16) with reference to figures. As shown in FIG. 1 to FIG. 4, the honeycomb structural body 1 is comprised of partition walls 11 arranged in a lattice shape and a plurality of cells 12 formed surrounded by the partition walls 11 to form a monolithic body. In addition, the honeycomb structural body 1 is comprised of a plurality of cell density sections 2 having a different cell density, which is changed in a cross section perpendicular to an axial direction X from a central side to the outer peripheral side. A boundary section 14 is formed between the cell density sections 2 which are adjacent to each other. FIG. 1 (a), FIG. 2 and FIG. 3 show the honeycomb structural body 1 having the two cell density sections 2 (21, 22) having a different cell density. FIG. 4 shows the honeycomb structural body having the three cell density sections 2 (21, 22, 23) having a different cell density. However, it is acceptable for the honeycomb structural body to have a plurality of cell density sections 2 (not less than four, i.e. 21, 22, . . . , and 2n) as shown in FIG. 1 (b).

As shown in these figures, the plural cell density sections 2 have the high cell density section 2a and the low cell density section 2b. The high cell density section 2a has the maximum cell density, excepting the outermost cell density section 2. The low cell density section 2b has the minimum cell density, excepting the innermost cell density section 2. Further, the honeycomb structural body 1 satisfies a relationship of $V-Va \geq Vb+Vs$, where reference character V indicates a volume of the honeycomb structural body 1 if the overall honeycomb structural body is composed of the high cell density section 2a only, reference character Va indicates a volume of the high cell density section 2a, reference character Vb indicates a volume of the low cell density section 2b, and reference character Vs indicates a volume of the boundary wall 14 (14b) which separates the low cell density section 2b from the cell density section 2 formed immediately inside of the low cell density section 2b. Hereinafter, these features will now be explained.

As shown in FIG. 1, the honeycomb structural body 1 (which corresponds to embodiments E1 to E16) is used as a catalyst supporting member in order to purify exhaust gas. The honeycomb structural body 1 is comprised of the partition walls 11, the plural cells 12 and an outer peripheral wall 13. The partition walls 11 are arranged in a square lattice shape. The cells 12 are surrounded by the partition walls 11. An outer peripheral surface of the honeycomb structural body 1 is covered with the outer peripheral wall 13. The honeycomb structural body 1 is made of cordierite and formed to a monolithic body. The honeycomb structural body 1 has a diameter of 103 mm, and a length of 105 mm.

As shown in FIG. 2 and FIG. 3, in the honeycomb structural body 1 according to the embodiments E1 to E11 and the embodiments E13 to E16, a cross section perpendicular to an axial direction X (see FIG. 1) of the honeycomb structural body 1 is divided to two cell density sections 2 (i.e. to a first cell density section 21 and a second cell density section 22) from a central side to an outer peripheral side. Each of the cell density sections 2 has a constant cell density, respectively. The honeycomb structural body 1 has the structure in which the cell density sections 2, which are adjacent to each other, have a different cell density so that the cell density is changed stepwise toward the radial direction.

As shown in these figures, the first cell density section 21 corresponds to the high cell density section 2a previously described, and is arranged at the innermost side as the central section of the honeycomb structural body 1.

The second cell density section 22 corresponds to the low cell density section 2b previously described, and is arranged at the outermost side as the outer peripheral section of the honeycomb structural body 1. In the honeycomb structural body 1 shown in FIG. 2(a), the cells 12 are formed to tilt in the same direction in the first cell density section 21 and the second cell density section 22. However, like the honeycomb structural body 1 shown in FIG. 2(b), it is possible for the cells 12 to tilt in a different direction (the cell 12 in the second cell density section 22 tilt to the cell 12 in the first cell density section 21 by 45°.

As shown in FIG. 4, the honeycomb structural body 1 according to the embodiment E12 has the three cell density sections (i.e. the first cell density section 21, the second cell density section 22, and the third cell density section 23) arranged in a radial direction from the central side to the outer peripheral side in a cross section perpendicular to the axial direction X (see FIG. 1). Each of the cell density sections 2 has a constant cell density. Further, the adjacent cell density sections 2 have a different cell density which is changed stepwise in a radial direction.

The first cell density section 21 corresponds to the high cell density section 2a previously described and is arranged at the central side, i.e. at the innermost side of the honeycomb structural body 1. The second cell density section 22 corresponds to the low cell density section 2b previously described and is arranged immediately outside of the first cell density section 21. The third cell density section 23 has a cell density which is lower than that of the first cell density section 21 and higher than that of the second cell density section 22. The third cell density section 23 is arranged immediately outside of the second cell density section 22, i.e. at the outermost side of the honeycomb structural body 1. Thus, this structure, which avoids arranging the cell density section 2 having the minimum cell density (i.e. the low cell density section 2b) at the outermost side, makes it possible to maintain the strength (i.e. isostatic strength, etc.) of the honeycomb structural body 1.

Further, as shown in FIG. 2 to FIG. 4, the honeycomb structural body 1 (i.e. the embodiments E1 to E16) satisfies the relationship of $Ta \leq Tb$, where reference character Ta indicates a thickness of the partition wall 11 in the high cell density section 2a (i.e. the first cell density section 21) and reference character Tb indicates a thickness of the partition wall 11 in the low cell density section 2b (i.e. the second cell density section 22). Still further, the honeycomb structural body 1 (i.e. the embodiments E1 to E4, E6, and E8 to E15) satisfies the relationship of $1 < Ma/Mb < 2$, where reference character Ma indicates a cell density of the high cell density section 2a (i.e. the first cell density section 21) and reference character Mb indicates a cell density of the low cell density section 2b (i.e. the second cell density section 22). Table 1 and Table 2 show a thickness (mm) of a partition wall, a cell density (cells/cm$^2$), a porosity (%) and a cell density ratio Ma/Mb of the honeycomb structural body 1 (each of the embodiments E1 to E16).

Figure 5:
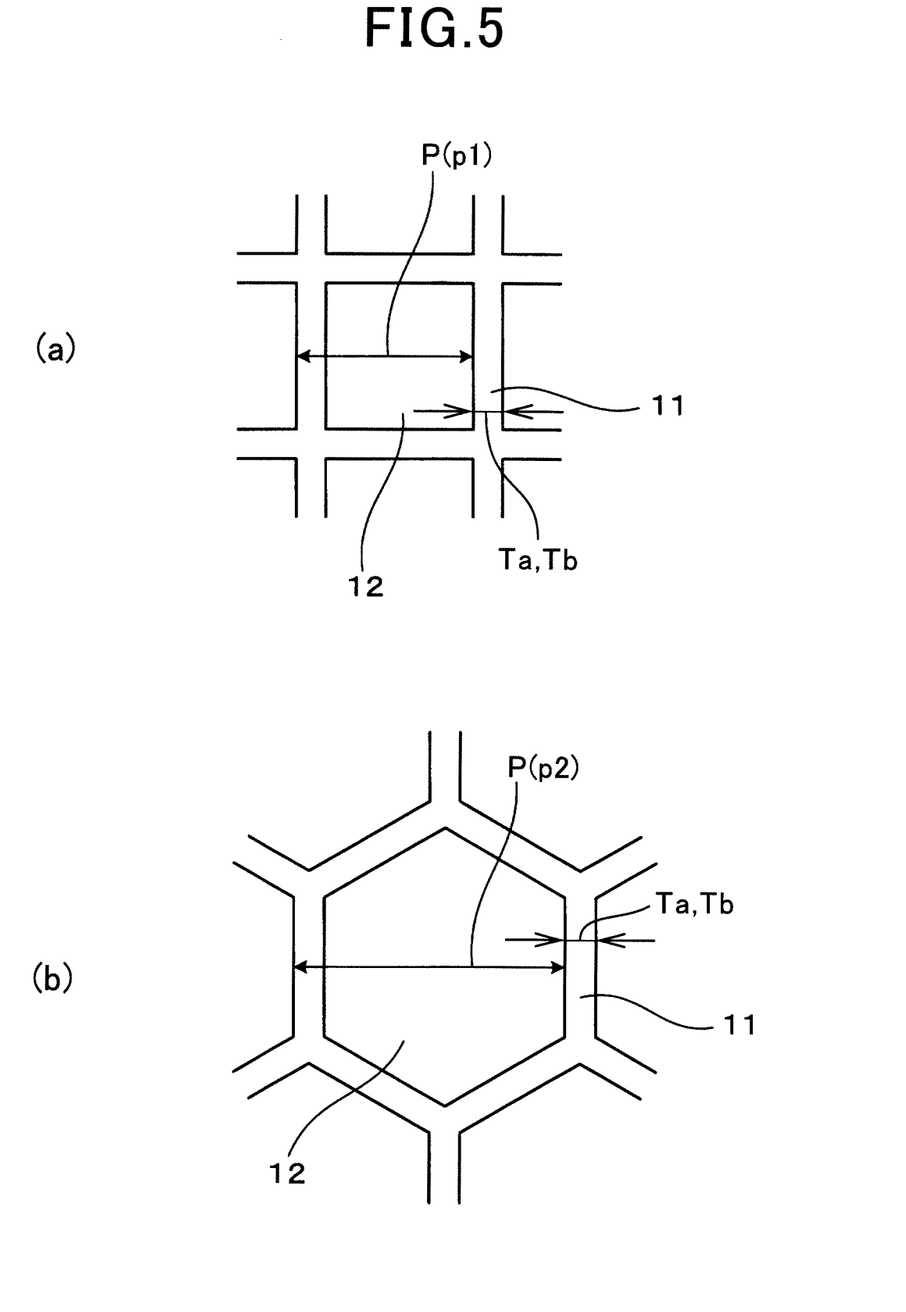
FIG. 5 are perspective views explaining a cell pitch of cells in the honeycomb structural body according to the embodiments.

A description will now be given of the method of obtaining a cell density of each of the cell density sections 2. A cell pitch P shown in FIG. 5(a) and FIG. 5(b) is measured by using a tool maker's microscope, another microscope, etc. in order to obtain a cell density in a radial cross section of the honeycomb structural body 1. The cell density (cpsi) can be calculated by using the following equation and the measured cell pitch P. The exemplary embodiment used a microscope (VHX-900 manufactured by KEYENCE CORPORATION) and measured five points of each of the cell density sections 2 and calculates an average value of the measured cell pitches P. The reference character "cpsi" of the cell density expresses the number of cells per square inch. Table 1 uses the unit (cells/cm$^2$) which is converted from the unit "cpsi".

For example, as shown in FIG. 5(a), when the cell 12 has a square shape, like the structure of the embodiments E1 to E16, and an average cell pitch is p1, the cell density (cpsi) is calculated by using the following equation: Cell density $(cpsi) = (25.4/p1)^2$. In addition, as shown in FIG. 5(b), when the cell 12 has a hexagonal shape and an average cell pitch is p2, the cell density (cpsi) is calculated by using the following equation: Cell density $(cpsi) = (2/\sqrt{3}) \times (25.4/p2)^2$.

As shown in FIG. 2 to FIG. 4, the partition wall 14 having a cylindrical shape is formed between the cell density sections 2, which are adjacent to each other, in the honeycomb structural body 1 (i.e. the embodiments E1 to E16). That is, the partition wall 14 partitions off the cell density sections 2 which are adjacently arranged. The boundary wall 14 in the honeycomb structural body 1 corresponding to the embodiment E14 (see FIG. 3) has an octagonal shape. The boundary wall 14 in the honeycomb structural body 1 corresponding to other embodiments (see FIG. 2 and FIG. 4) has a circular shape. In addition, the honeycomb structural body 1 satisfies a relationship of $0.2 \leq r/R < 1$, where reference character R indicates a radius of the honeycomb structural body 1, and reference character r indicates a radius of the boundary wall 14 which separates the high cell density section 2a (i.e. the first cell density section 21) from the cell density section 2 (i.e. the second cell density section 22) which is formed immediately outside of the high cell density section 2a. Because the boundary wall 14 in the honeycomb structural body 1 corresponding to the embodiment E14 has an octagonal shape, reference character r indicates a radius of an inscribed circle of the octagonal shape. Table 1 and Table 2 show a thickness (mm) of the boundary wall, and a location r/R of the boundary wall in the honeycomb structural body 1 (which corresponds to the embodiments E1 to E16).

As shown in these figures, the honeycomb structural body 1 (i.e. the embodiments E1 to E16) satisfies a relationship of V−Va≥Vb+Vs, that is, satisfies a relationship of (V−Va)/(Vb+Vs)≥1, where reference character V indicates a volume of the honeycomb structural body if the overall honeycomb structural body 1 is composed of the high cell density section 2a only, reference character Va indicates a volume of the high cell density section 2a, reference character Vb indicates a volume of the low cell density section 2b, and reference character Vs indicates a volume of the boundary wall 14 (14b) which separates the low cell density section 2b (i.e. the second cell density section 22) from the cell density section 2 (i.e. the first cell density section 21) formed immediately inside of the low cell density section 2b. That is, Table 1 and Table 2 show the value (V−Va)/(Vb+Vs) of the honeycomb structural body 1 (i.e. the embodiments E1 to E16).

As previously described, when a radius of the honeycomb structural body 1 is designated by reference character R, a radius of the boundary wall 14 is designated by reference character r, an axial length of the honeycomb structural body 1 is designated by reference character L, and a thickness of the boundary wall 14 is designated by reference character Ls, it is possible to calculate the volumes V, Va, Vb and Vs of the honeycomb structural body 1 having a cylindrical shape by the following equations:

$$V = \pi \times R^2 \times L \times (1-OFA/100) \times (1-porosity/100),$$

$$Va = \pi \times (r-ts/2)^2 \times L \times (1-OFA \text{ of high cell density section}/100) \times (1-porosity \text{ of high cell density section}/100),$$

$$Vb = \{R^2 - (r+ts/2)^2\} \times \pi \times L \times (1-OFA \text{ of low cell density section}/100) \times (1-porosity \text{ of low cell density section}/100), \text{ and}$$

$$Vs = \{\pi \times (r+ts/2)^2 \times L\} - \{\pi \times (r-ts/2)^2 \times L\} \times (1-porosity \text{ of boundary wall}/100),$$

where OFA is an abbreviation for an Open Frontal Area which indicates an opening ratio of the cell 12.

Figure 6:
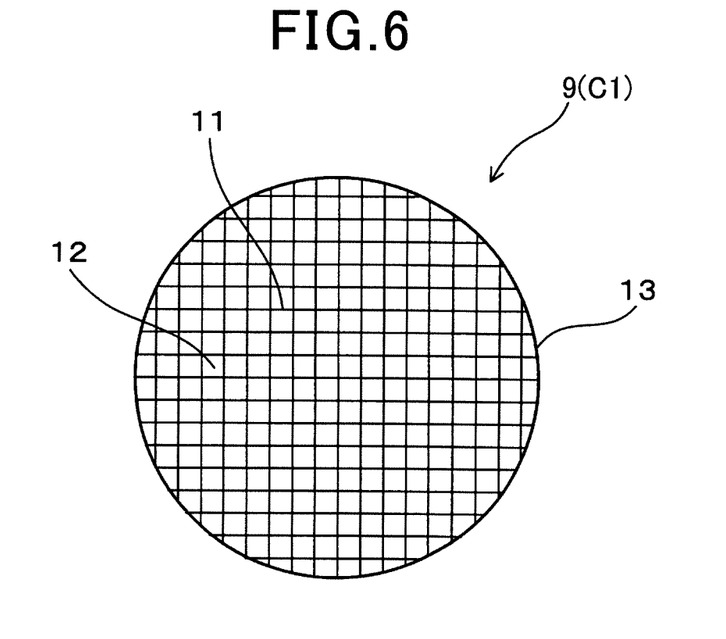
FIG. 6 is a view explaining a cross section in a radial direction of the honeycomb structural body according to a comparison example C1.
Figure 7:
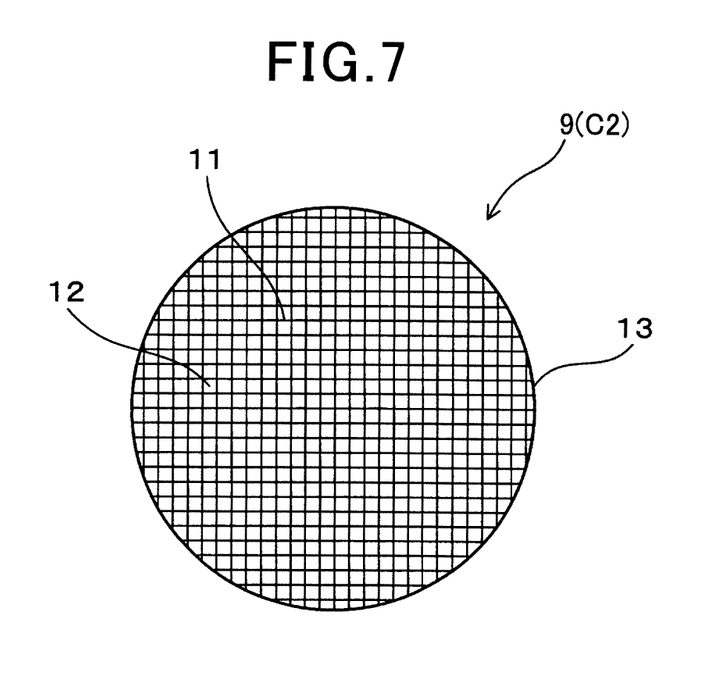
FIG. 7 is a view explaining a cross section in a radial direction of the honeycomb structural body according to a comparison example C2.

Next, a description will now be given of the honeycomb structural body 9 (i.e. the comparison examples C1 to C3) with reference to figures. As shown in FIG. 6 and FIG. 7, the honeycomb structural body 9, according to the comparison examples C1 and C2 is comprised of a cell density section only (i.e. the first cell density section indicated in Table 1 and Table 2), which is different in structure from the honeycomb structural body 1 according to the embodiments E1 to E16 as previously described. That is, the overall area of the honeycomb structural body 9 has a constant cell density. The honeycomb structural body 9 according to the comparison example C1 (see FIG. 6(a)) has a cell density which is lower than the cell density of the honeycomb structural body 9 according to the comparison example C2 (see FIG. 7). Other components of the honeycomb structural body 9 have the same structure of those of the honeycomb structural body 1 according to the embodiments E1 to E16 as previously described.

The volumes V, Va, Vb and Vs in the comparison example C3 have a relationship of (V−Va)/(Vb+Vs)<1. Other components of the comparison sample C3 have the same structure of those of the honeycomb structural body 1 according to the embodiments E1 to E16 as previously described. Table 1 and Table 2 show the thickness (mm) of the partition wall, the cell density (cells/cm$^2$), the porosity (%), etc. of the comparison examples C1, C2 and C3.

Next, a description will now be given of the method of producing the honeycomb structural body (according to the embodiments E1 to E16 and the comparison examples C1 to C3). First, ceramic raw material was prepared. The ceramic raw material was substantially composed of kaolin, fused silica, aluminum hydroxide, alumina, talc, carbon particles, etc. to satisfy the chemical composition of cordierite of $SiO_2$: 45 to 55%, $Al_2O_3$: 33 to 42%, and MgO: 12 to 18%. Water, binder, and others of a predetermined amount were added into the ceramic raw material, and then mixed together in order to make the ceramic raw material.

Next, the obtained ceramic raw material was extruded using a extrusion molding die to produce a honeycomb structural mold by using an extrusion die having a plurality of slit grooves. The pattern of the slit grooves corresponds to the arrangement or a shape of the partition walls. The honeycomb structural mold was dried by using microwaves. The dried honeycomb structural mold was cut to have a predetermined length, and then fired at a predetermined maximum temperature (for example, 1390° C. to 1430° C.) to produce the honeycomb structural bodies.

Next, a description will now be given of the evaluation of a thermal shock resistance and exhaust gas purification performance of the honeycomb structural body (i.e. the embodiments E1 to E16 and the comparison examples C1 to C3). Hereinafter, the evaluation method for the thermal shock resistance and the exhaust gas purification performance will be explained.

Figure 8:
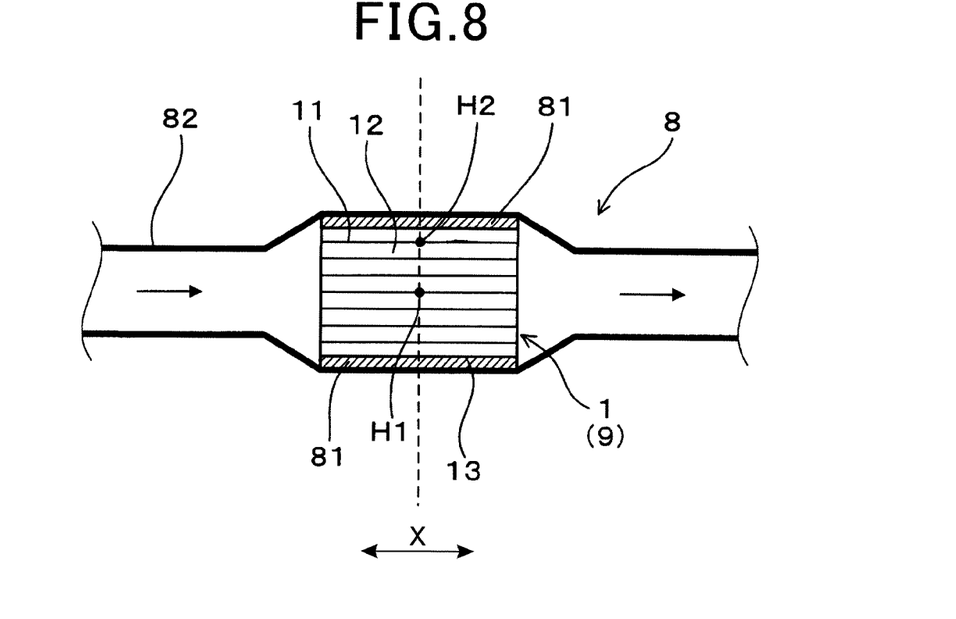
FIG. 8 is a view showing a catalytic converter equipped with the honeycomb structural body according to the exemplary embodiments.

In the evaluation method for the thermal shock resistance, as shown in FIG. 8, the honeycomb structural body 1 (9) was wrapped with an alumina mat 81 and was arranged in the inside of an exhaust gas pipe 82. This forms a catalytic converter 8. Catalyst was supported in advance in the honeycomb structural body 1 (9). It is possible to use catalyst, to be supported in the honeycomb structural body, comprised of γ alumina, and/or cerium, and at least one of platinum (Pt), rhodium (Rh) and palladium (Pd) as noble metal, i.e. a three-way catalyst.

Two thermocouples H1 and H2 are mounted to middle points in the axial direction X of the honeycomb structural body 1 (9). One thermocouple H1 is arranged at a central position (at the location of the central axis) in a cross section perpendicular to the axial direction X. The other thermocouple H2 is arranged at a position which corresponds to a length of 10 percent of a radius measured from the outer periphery to the inner side of the honeycomb structural body 1 (9).

The catalytic converter 8 was mounted to an engine (V type eight cylinder engine), and the engine was driven under a condition of WOT (Wide open throttle). The honeycomb structural body 1 (9) was left for a predetermined time length (five minutes) so that the central section (at the thermocouple H1) thereof has a predetermined temperature (1050° C.). After this, the rotation speed of the engine dropped to enter its idling state and to perform the rapid cooling of the honeycomb structural body 1 (9). A temperature difference ΔT (° C.) between the central point (at the thermocouple H1) and the outer peripheral section (at the thermocouple H2) was detected. The exemplary embodiment obtained a temperature difference ΔT ratio on the basis of a temperature difference ΔT (° C.) of the comparison example C2 as a reference value.

In the evaluation of the exhaust gas purification performance, a honeycomb structural body was prepared, which is equivalent in deterioration to a case after a vehicle with the honeycomb structural body has run for one hundred thousand kilometers. Next, the honeycomb structural body 1 (9) was mounted at a S/C position (a Start Catalyst position) of the internal combustion engine. The honeycomb structural body with catalyst which has been adequately deteriorated by heating by using an electric furnace was mounted to a UF/C position (underfloor catalyst) of the internal combustion engine of a vehicle. After the vehicle has run with a predetermined mode (LA#4 evaluation mode), and an amount of each of emissions (HC, CO and NOx) emitted from the internal combustion engine was detected. An emission ratio of each of the embodiments and the comparison examples was obtained on the basis of the emission amount of the comparison example C2 as a reference value. The S/C position indicates a position (at the upstream side of the exhaust gas flow) immediately after an exhaust port of the internal combustion engine mounted to the exhaust gas passage through which exhaust gas emitted from the internal combustion engine flows. Further, the UF/C position indicates a position (at the downstream side of the exhaust gas flow) directly under the floor of the vehicle at the downstream side of the S/C position.

TABLE 1

| | | Comparison examples | | | Embodiments | | | | | | |
|---|---|---|---|---|---|---|---|---|---|---|---|
| | | C1 | C2 | C3 | E1 | E2 | E3 | E4 | E5 | E6 | E7 |
| First cell density section | Partition wall thickness (mm) | 0.09 | 0.09 | 0.09 | 0.09 | 0.09 | 0.09 | 0.09 | 0.09 | 0.09 | 0.09 |
| | Cell density (cells/cm$^2$) | 62.0 | 93.0 | 93.0 | 93.0 | 93.0 | 93.0 | 93.0 | 93.0 | 93.0 | 93.0 |
| | Porosity (%) | 33 | 33 | 33 | 33 | 33 | 33 | 33 | 33 | 33 | 33 |
| Second cell density section | Partition wall thickness (mm) | — | — | 0.11 | 0.09 | 0.10 | 0.11 | 0.09 | 0.09 | 0.09 | 0.09 |
| | Cell density (cells/cm$^2$) | — | — | 62.0 | 62.0 | 62.0 | 46.5 | 46.5 | 38.8 | 62.0 | 31.0 |
| | Porosity (%) | — | — | 33 | 33 | 33 | 33 | 33 | 33 | 33 | 33 |
| Thickness (mm) boundary wall | | — | — | 0.1 | 0.1 | 0.1 | 0.1 | 0.1 | 0.1 | 0.05 | 0.05 |
| Location r/R of boundary wall | | — | — | 0.77 | 0.77 | 0.77 | 0.77 | 0.77 | 0.77 | 0.77 | 0.77 |
| Cell density ratio Ma/Mb | | — | — | 1.5 | 1.5 | 1.5 | 2 | 2 | 2.4 | 1.5 | 3 |
| (V − Va)/(Vb + Vs) | | — | — | 0.94 | 1.17 | 1.05 | 1.08 | 1.35 | 1.47 | 1.19 | 1.69 |
| Temperature difference ΔT ratio | | — | 1 | 1.02 | 0.96 | 0.98 | 0.97 | 0.93 | 0.935 | 0.95 | 0.97 |
| Emission ratio | | 1.13 | 1 | — | 0.7 | — | — | 0.99 | — | — | — |

TABLE 2

| | | Comparison examples | | | Embodiments | | | | | | | | |
|---|---|---|---|---|---|---|---|---|---|---|---|---|---|
| | | C1 | C2 | C3 | E8 | E9 | E10 | E11 | E12 | E13 | E14 | E15 | E16 |
| First cell density section | Partition wall thickness (mm) | 0.09 | 0.09 | 0.09 | 0.09 | 0.09 | 0.09 | 0.09 | 0.09 | 0.09 | 0.09 | 0.09 | 0.09 |
| | Cell density (cells/cm$^2$) | 62.0 | 93.0 | 93.0 | 93.0 | 93.0 | 93.0 | 93.0 | 93.0 | 93.0 | 93.0 | 93.0 | 93.0 |
| | Porosity (%) | 33 | 33 | 33 | 33 | 33 | 33 | 33 | 33 | 33 | 33 | 33 | 33 |
| Second cell density section | Partition wall thickness (mm) | — | — | 0.11 | 0.09 | 0.09 | 0.09 | 0.10 | 0.09 | 0.09 | 0.09 | 0.09 | 0.09 |
| | Cell density (cells/cm$^2$) | — | — | 62.0 | 74.4 | 49.6 | 62.0 | 62.0 | 62.0 | 62.0 | 62.0 | 58.9 | 31.0 |
| | Porosity (%) | — | — | 33 | 33 | 33 | 33 | 33 | 33 | 33 | 33 | 33 | 33 |
| Third cell density section | Partition wall thickness (mm) | — | — | — | — | — | — | — | 0.09 | — | — | — | — |
| | Cell density (cells/cm$^2$) | — | — | — | — | — | — | — | 62.0 | — | — | — | — |
| | Porosity (%) | — | — | — | — | — | — | — | 33 | — | — | — | — |
| Thickness (mm) boundary wall | | — | — | 0.1 | 0.1 | 0.1 | 0.1 | 0.1 | 0.1 | 0.1 | 0.1 | 0.1 | 0.1 |
| Location r/R of boundary wall | | — | — | 0.77 | 0.77 | 0.77 | 0.6 | 0.53 | 0.77 | 0.77 | 0.77 | 0.77 | 0.77 |
| Cell density ratio Ma/Mb | | — | — | 1.5 | 1.25 | 1.875 | 1.5 | 1.5 | 1.5 | 1.5 | 1.5 | 1.58 | 3 |
| (V − Va)/(Vb + Vs) | | — | — | 0.94 | 1.08 | 1.31 | 1.19 | 1.06 | 1.07 | 1.17 | 1.17 | 1.21 | 1.63 |
| Temperature difference ΔT ratio | | — | 1 | 1.02 | — | — | — | — | 0.975 | 0.97 | 0.97 | 0.96 | 0.925 | 0.928 |
| Emission ratio | | 1.13 | 1 | — | 0.85 | 0.92 | 0.67 | 0.69 | — | — | — | — | — |

Table 1 and Table 2 show the evaluation results of the thermal shock resistance and the exhaust gas purification performance. As can be understood from Table 1 and Table 2, the honeycomb structural body according to the embodiments E1 to E16 satisfies the relationship of $(V-Va)/(Vb+Vs) \geq 1$ and has the temperature difference $\Delta T$ ratio of less than 1 and the emission ratio of less than 1. Specifically, the structure of the honeycomb structural body according to the embodiments E1 to E7 and E11 to E16 makes it possible to have a decreased temperature difference $\Delta T$ ratio and suppress a temperature difference between the inner side and outer side at a rapid cooling, when compared with the comparison example C2 in which an overall area of the comparison example C2 has a constant cell density, and the comparison example C3 having the relationship of $(V-Va)/(Vb+Vs)<1$. In addition, the honeycomb structural body according to the embodiments E1, E4 and E8 to E11 makes it possible to have a decreased emission amount when compared with that of the comparison examples C1 and C2 in which an overall area thereof has a constant cell density. As a result, it can be understood that the honeycomb structural body according to the embodiments E1 to E16 has a superior thermal shock resistance and a superior exhaust gas purification performance.

Figure 9:
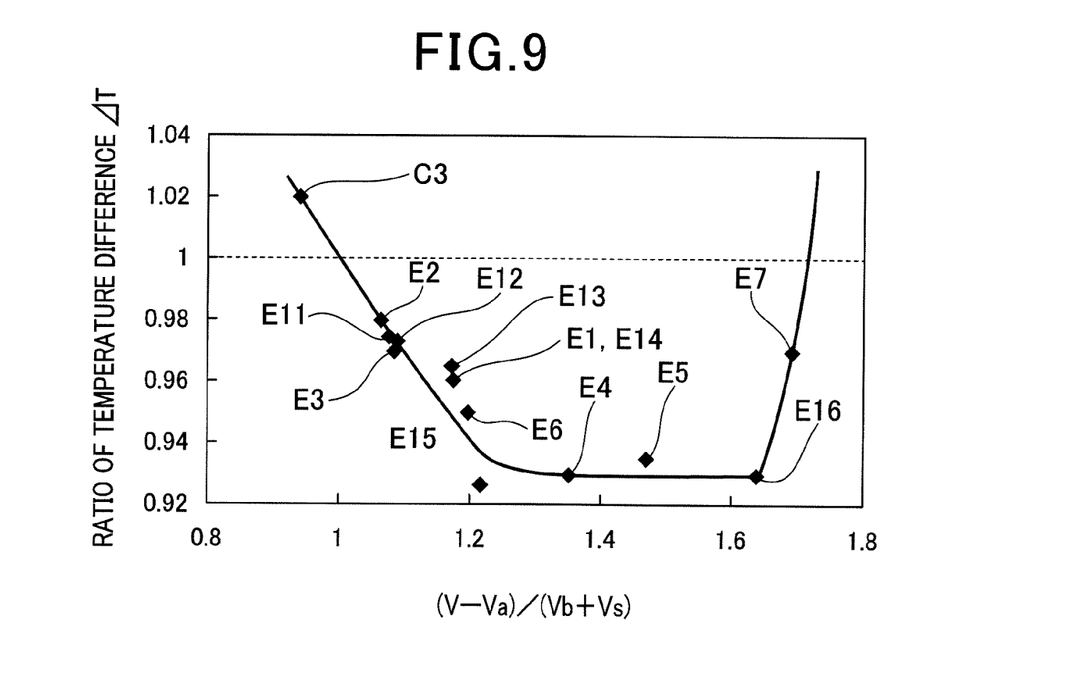
FIG. 9 is a graph showing a relationship between a value of $(V-Va)/(Vb+Vs)$ and a temperature difference $\Delta T$ ratio according to the embodiments.

FIG. 9 shows the relationship between the value $(V-Va)/(Vb+Vs)$ and the temperature difference $\Delta T$ ratio obtained from the evaluation results shown in Table 1 and Table 2. In the same figure, the temperature difference $\Delta T$ ratio of the embodiments E1 to E7 and E11 to E16 are plotted. As can be understood from the same figure, it is possible to reliably decrease the temperature difference $\Delta T$ (temperature difference $\Delta T$ ratio of less than 1) and increase the thermal shock resistance when satisfying the relationship of $1 \leq (V-Va)/(Vb+Vs) \leq 1.72$. In particular, it is possible to further improve these effects when satisfying the relationship of $1.2 \leq (V-Va)/(Vb+Vs) \leq 1.63$, like the embodiments E4, E5, E15 and E16, and further satisfying the relationship of $1.2 \leq (V-Va)/(Vb+Vs) \leq 1.58$, like the embodiments E4, E5 and E15.

Figure 10:
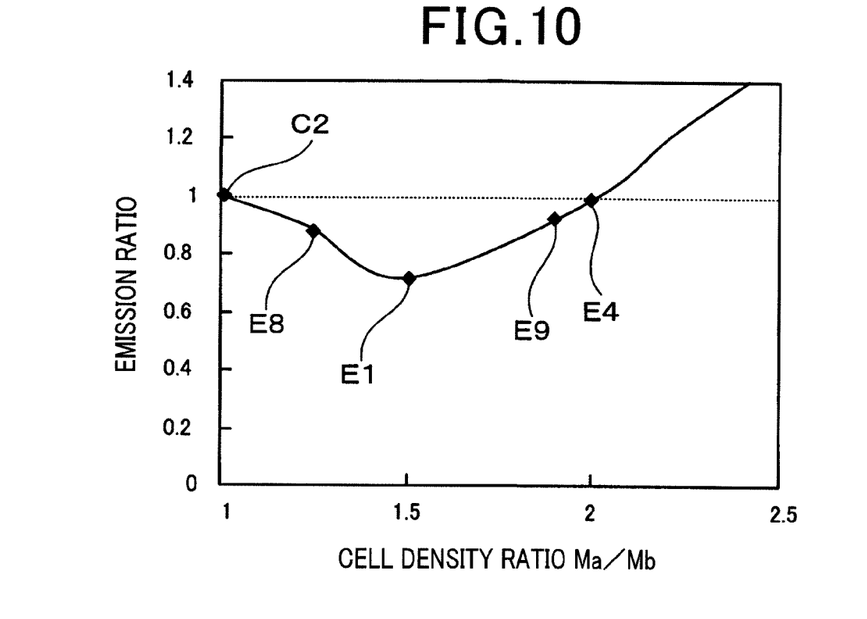
FIG. 10 is a graph showing a relationship between a cell density ratio Ma/Mb and an emission ratio of the honeycomb structural bodies according to the exemplary embodiments.

In addition, FIG. 10 shows the relationship between the cell density ratio Ma/Mb and the emission ratio on the basis of the evaluation results shown in Table 1 and Table 2. The emission ratio of each of the embodiments E1, E4, E8 and E9 and the comparison example C2 is plotted in FIG. 10. The comparison example C2 has the cell density ratio Ma/Mb=1 (The cell density ratio Ma/Mb of the comparison example C2 is designated with reference character "-" in Table 1 and Table 2). As can be understood from FIG. 10, when the honeycomb structural body has the relationship of $1<Ma/Mb \leq 2$, it is possible to reliably decrease the emission ratio (of less than 1) and increase the exhaust gas purification performance. Still further, when the honeycomb structural body has the relationship of $1.25 \leq Ma/Mb \leq 1.5$, it is possible to further decrease the emission ratio and further increase the exhaust gas purification performance.

Figure 11:
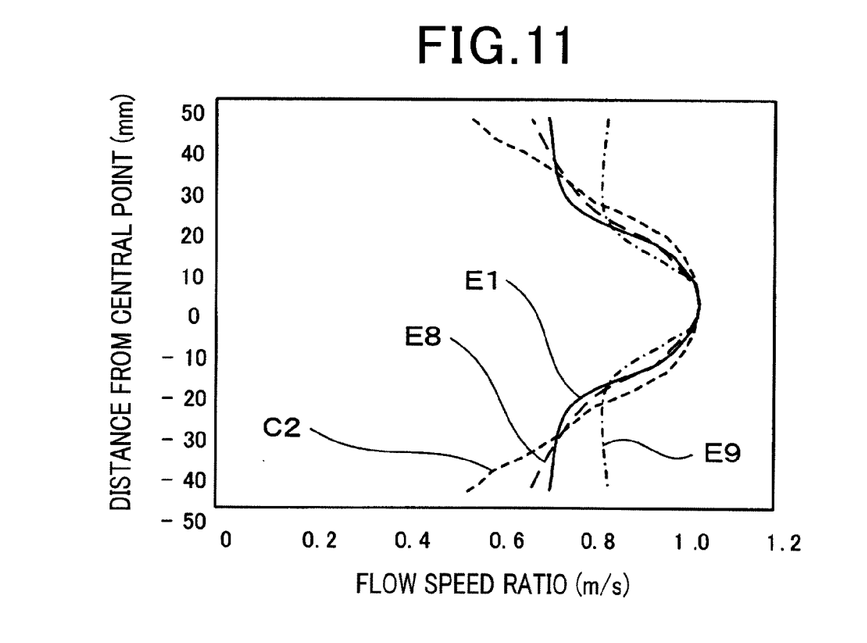
FIG. 11 is a graph showing a relationship between a distance measured from a central point of the honeycomb structural body and a flow speed in the honeycomb structural bodies according to the exemplary embodiments.

FIG. 11 shows a relationship between a distance measured from a central point of a honeycomb structural body and a flow speed of exhaust gas. The flow speed rate of each of the embodiments E1, E8 and E9 and the comparison example C2 are plotted. A description will now be given of the method of detecting a flow speed of exhaust gas. As shown in FIG. 8, the honeycomb structural body 1 (9), which supported catalyst capable of purifying exhaust gas, was mounted to the inside of an exhaust gas pipe 82 to make a catalytic converter 8. A flow speed meter (not shown) is arranged at the downstream side of the honeycomb structural body. Next, a predetermined amount of air was supplied to the honeycomb structural body 1 (9), and a flow speed of the air immediately passed through the honeycomb structural body 1 (9) was detected. As can be understood from this figure, it is possible for the embodiments E1, E8 and E9 to decrease a fluctuation of air flow speed between the inner side and the outer side of the honeycomb structural body because of having the adjusted cell density ratio Ma/Mb when compared with that of the comparison example C2. That is, it is possible for these embodiments to have a uniform flow speed. This makes it possible to decrease its emission amount and improve the exhaust purification performance.

Figure 12:
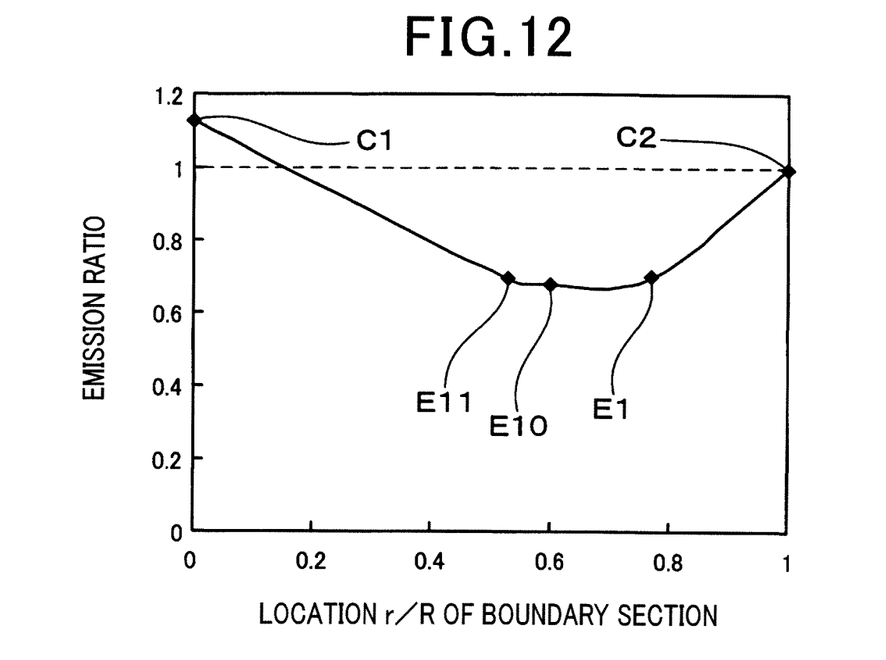
FIG. 12 is a graph showing a relationship between a location r/R of the boundary wall and the emission ratio of the honeycomb structural bodies according to the exemplary embodiments.

Further, FIG. 12 shows the relationship between the location r/R of the boundary wall and the emission ratio on the basis of the evaluation results shown in Table 1 and Table 2. The emission ratio of each of the embodiments E1, E10 and E11 and the comparison examples C1 and C2 are plotted in this figure. Because the comparison example C1 is different in cell density from the embodiments E1, E10 and E11, the location r/R of the boundary wall in the comparison example C1 is zero (r/R=0). (Specifically, the location r/R of the boundary section in the comparison example C1 is designated with reference character "-" in Table 1 and Table 2.) In addition, because the comparison example C2 and the embodiments E1, E10 and E11 have the same cell density, the location r/R of them becomes 1, i.e. r/R=1. (Specifically, in Table 1 and Table 2 the location r/R of the boundary section in the comparison example C2 is designated with reference character "-".) As can be understood from this figure, it is possible to reliably decrease the emission ratio (it is possible to have the emission ratio of less than 1) because of having the relationship of $0.2 \leq r/R < 1$. When having the relationship of $0.5 \leq r/R \leq 0.8$, it is possible to further decrease the emission ratio and more improve the exhaust gas purification performance.

REFERENCE SIGNS LIST

1 Honeycomb structural body,
11 Partition wall,
12 Cell,
14 Boundary wall,
2 Cell density section,
2a High cell density section, and
2b Low cell density section.

The invention claimed is:

1. A honeycomb structural body as a monolithic body made of cordierite comprising partition walls arranged in a lattice shape and a plurality of cells surrounded by the partition walls, wherein the honeycomb structural body comprises a plurality of cell density sections having a cell density changed stepwise in a radial direction from a central side to an outer peripheral side in a cross section which is perpendicular to an axial direction, a boundary wall is formed between the cell density sections which are adjacent to each other in order to partition off these cell density sections, the cell density sections comprise a high cell density section having a maximum cell density, excepting an outermost cell density section formed at an outermost side, and a low cell density section having a minimum cell density, excepting an innermost cell density section formed at an innermost side, and the honeycomb structural body satisfies a relationship of $V-Va \geq Vb+Vs$, where reference character V indicates a volume of the honeycomb structural body if the overall honeycomb structural body is composed of the high cell density section only, reference character Va indicates a volume of the high cell density section, reference character Vb indicates a volume of the low cell density section, and reference character Vs indicates a volume of the boundary wall which separates the low cell density section from the cell density section formed immediately inside of the low cell density section.

2. The honeycomb structural body according to claim 1, wherein the volumes V, Va, Vb and Vs in the honeycomb structural body satisfy a relationship $1 \leq (V-Va)/(Vb+Vs) \leq 1.72$.

3. The honeycomb structural body according to claim 1 wherein the volumes V, Va, Vb and Vs in the honeycomb structural body satisfy a relationship of $1.2 \leq (V-Va)/(Vb+Vs) \leq 1.58$.

4. The honeycomb structural body according to claim 1, wherein the honeycomb structural body satisfies a relationship of $Ta \leq Tb$, where reference character Ta indicates a thickness of the partition wall in the high cell density section, and reference character Tb indicates a thickness of the partition wall in the low cell density section.

5. The honeycomb structural body according to claim 1, wherein the honeycomb structural body satisfies a relationship of $1 < Ma/Mb < 2$, where reference character Ma indicates a cell density of the high cell density section, and reference character Mb indicates a cell density of the low cell density section.

6. The honeycomb structural body according to claim 1, wherein the honeycomb structural body satisfies a relationship of $0.2 \leq r/R < 1$, where reference character R indicates a radius of the honeycomb structural body, and reference character r indicates a radius of the boundary wall which separates the high cell density section from the cell density section formed immediately outside of the high cell density section.

7. The honeycomb structural body according to claim 1, wherein the high cell density section is arranged at the innermost side in the cell density sections.

8. The honeycomb structural body according to claim 5, wherein the honeycomb structural body satisfies a relationship of $1.25 < Ma/Mb < 1.5$, where reference character Ma indicates the cell density of the high cell density section, and reference character Mb indicates the cell density of the low cell density section.

9. The honeycomb structural body according to claim 6, wherein the honeycomb structural body satisfies a relationship of $0.5 < r/R < 0.8$, where reference character R indicates the radius of the honeycomb structural body, and reference character r indicates the radius of the boundary wall which separates the high cell density section from the cell density section formed immediately outside of the high cell density section.

* * * * *